(12) United States Patent
Iu et al.

(10) Patent No.: US 8,268,064 B2
(45) Date of Patent: Sep. 18, 2012

(54) INK-JET INKS AND INK SETS EXHIBITING REDUCED BLEED, WICKING, AND/OR HALO EFFECT AND ASSOCIATED METHODS

(75) Inventors: Kai-Kong Iu, San Diego, CA (US);
Dennis P Parazak, Oceanside, CA (US);
Dennis Guo, San Diego, CA (US);
Xiaohe Chen, San Diego, CA (US);
Rodney Stramel, San Diego, CA (US);
Howard A. Doumaux, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1485 days.

(21) Appl. No.: 11/540,140

(22) Filed: Sep. 28, 2006

(65) Prior Publication Data
US 2007/0076071 A1    Apr. 5, 2007

Related U.S. Application Data

(60) Provisional application No. 60/722,219, filed on Sep. 30, 2005.

(51) Int. Cl.
*C09D 11/02* (2006.01)
*G01D 11/00* (2006.01)

(52) U.S. Cl. .................. 106/31.6; 106/31.75; 106/31.86; 347/100

(58) Field of Classification Search .................. 106/31.6, 106/31.75, 31.86; 347/100
See application file for complete search history.

(56) References Cited

U.S. PATENT DOCUMENTS

| | | | |
|---|---|---|---|
| 5,554,739 A | 9/1996 | Belmont | |
| 5,707,432 A | 1/1998 | Adams et al. | |
| 6,328,894 B1 | 12/2001 | Chan et al. | |
| 6,398,858 B1 | 6/2002 | Yu et al. | |
| 6,436,178 B1 * | 8/2002 | Hosmer | 106/31.46 |
| 6,478,863 B2 * | 11/2002 | Johnson et al. | 106/31.6 |
| 6,488,753 B1 * | 12/2002 | Ito et al. | 106/31.9 |
| 6,494,943 B1 | 12/2002 | Yu et al. | |
| 6,554,891 B1 * | 4/2003 | Momose et al. | 106/31.86 |
| 6,979,365 B2 * | 12/2005 | Tsuru et al. | 106/31.6 |
| 2004/0035319 A1 * | 2/2004 | Yeh et al. | 106/31.6 |
| 2007/0044682 A1 * | 3/2007 | Nick et al. | 106/31.75 |

* cited by examiner

*Primary Examiner* — Melvin C Mayes
*Assistant Examiner* — Veronica F Faison

(57) ABSTRACT

Compositions, systems, and methods for ink-jet printing having improved black to color bleed control, reduced wicking, and/or reduced halo are described. The composition can include a functionalized carbon pigment dispersed in an ink vehicle. The carbon pigment includes functional groups chemically attached thereto. Suitable functional groups includes an aromatic ring structure having multiple carboxyl groups (or salts thereof) attached to the aromatic ring structure, wherein at least two of the multiple carboxyl groups are positioned on adjacent carbon atoms of the aromatic ring structure.

60 Claims, No Drawings

INK-JET INKS AND INK SETS EXHIBITING REDUCED BLEED, WICKING, AND/OR HALO EFFECT AND ASSOCIATED METHODS

The present application claims the benefit of U.S. Patent Application No. 60/722,219, filed on Sep. 30, 2005, which is incorporated herein by reference in its entirety.

FIELD OF THE INVENTION

The present invention relates generally to ink-jet ink compositions, ink-jet ink sets, and methods of printing ink-jet images. More particularly, the present invention relates to ink-jet inks which include certain types of functionalized black pigments, wherein the ink-jet inks exhibit reduced bleed, wicking, and/or halo effect when printed against other colored inks.

BACKGROUND OF THE INVENTION

There are several reasons that ink-jet printing has become a popular way of recording images on various media surfaces, particularly plain paper. Some of these reasons include low printer noise, capability of high-speed recording, and multi-color recording. Additionally, these advantages can be obtained at a relatively low price to consumers. However, though there has been great improvement in ink-jet printing, accompanying this improvement are increased demands by consumers in this area, e.g., higher speeds, higher resolution, full color image formation, increased stability, higher image quality, etc.

As new ink-jet inks are developed, there are several traditional characteristics that are considered when evaluating the ink for use in conjunction with a printing surface or other inks. Such characteristics include edge acuity and optical density of the image on the surface, black to color bleed control, black to color wicking, halo control, dry time of the ink on the substrate, adhesion to the substrate, lack of deviation in ink droplet placement, presence of all dots, resistance of the ink after drying to water and other solvents, long term storage stability, and long term reliability without corrosion or nozzle clogging. Though the above list of characteristics provides a worthy goal to achieve, there are difficulties associated with satisfying all of the above characteristics. Often, the inclusion of an ink component meant to satisfy one of the above characteristics can prevent another characteristic from being met. Thus, most commercial inks for use in ink-jet printers represent a compromise in an attempt to achieve at least an adequate response in meeting all of the above listed requirements.

One characteristic of many ink-jet inks is the tendency of the ink to mix with or run into an adjacently printed color. This characteristic is undesirable and is known as "bleed." The degree of bleed is apparent when printed black ink bleeds into an adjacent colored ink, and is typically manifested in the appearance of the black ink spreading into the colored ink. There are other related print phenomena that reduce print quality which are also occur when printing black and colored inks adjacently, such as halo and wicking. Halo effect relates to a white or gray band that can appear at the interface of black and colored inks which occurs as a result of liquid or colorant migration. Similarly, wicking refers to migration of ink from an image along paper fibers, thereby creating a ragged edge. Both of these phenomena, along with bleed, diminish print quality generally.

A variety of methods have been explored to achieve bleed control, reduction in halo effect, and/or reduction in wicking with varying degrees of success. For example, both reactive and non-reactive bleed control systems have been used to decreased bleed to some degree. However, most of these methods have focused on enhancing precipitation of the inks upon printing. Although effective with respect to bleed, this property also reduces the long term stability and reliability of the nozzle as it increases clogging and aggregation before printing. Typically, the addition of certain dispersants within the black ink can improve long term stability, but can also decrease bleed control. Other methods used to control bleed have included using salts, pH differentials, or cosolvents which are immediately removed upon printing. Methods which utilize salt mechanisms and/or pH differentials generally require that the colored inks used in conjunction with the black inks have certain chemical components or properties such as a salt or low pH. These types of methods are referred to as reactive bleed control. Accordingly, investigations continue into developing ink formulations and ink combinations that have improved properties and that do not improve one property at the significant expense of the others.

DETAILED DESCRIPTION OF THE PREFERRED EMBODIMENT(S)

Before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

In describing and claiming the present invention, the following terminology will be used.

The singular forms "a," "an," and "the" include plural referents unless the context clearly dictates otherwise. Thus, for example, reference to "a dye" includes reference to one or more of such materials.

As used herein, "vehicle" refers to ink vehicles or liquid vehicles which include liquid compositions that can be used to carry colorants to a substrate. Liquid vehicles are well known in the art, and a wide variety of ink vehicles may be used in accordance with embodiments of the present invention. Such ink vehicles may include a mixture of a variety of different agents, including without limitation, surfactants, solvents, co-solvents, buffers, biocides, viscosity modifiers, sequestering agents, stabilizing agents, and water. Vehicles can also carry other solids (other than colorants) as part of the vehicle, such as polymers, UV curable materials, plasticizers, latex particulates, etc., in some embodiments.

As used herein, "colored", when referring to ink-jet inks, refers to non-black ink compositions. For example, typical colored ink compositions include cyan, magenta, yellow, and mixtures thereof. Colored ink-jet inks of the present invention can be either dye-based or pigment-based.

As used herein, the term "reactive" when referring to ink sets refers to a chemical reaction between functionalized carbon black-containing ink and colored ink(s). Such reactive ink sets can be either by salt mechanisms, pH differential mechanisms, polymerization mechanisms, or other known reactive inks known to those skilled in the art. Thus, a "non-reactive" ink set is a combination of functionalized carbon black-containing ink and colored ink(s) which does not involve such mechanisms to prevent bleed of one ink into an adjacent ink upon printing. In other words, the term "reactive" is relative with respect to the other inks in the ink set only, and reactivity with other materials or substances is not precluded. For example, a non-reactive ink can be reactive with a paper or other media substrate and still be considered non-reactive in accordance with embodiments of the present invention.

As used herein, "pigment" refers to a colorant particle which is substantially insoluble in the ink vehicle in which it is used.

As used herein, "functionalized" refer to pigment particles which have a compound chemically attached via covalent bonds. This is in contrast to pigment particles which have compounds attached via ionic bonds or other weaker intermolecular forces.

As used herein, "bleed" refers to the tendency of ink to run into and mix with adjacently printed inks. Bleed typically occurs prior to adjacently printed inks fully drying on a substrate. The degree of bleed will depend on a variety of factors such as the drying speed of the ink, ink chemistry, e.g., the presence of reactive or non-reactive bleed control mechanisms, and type of substrate, among other variables. In accordance with embodiments of the present invention, bleed can be reduced without the use of a reactive ink mechanism, though reactive ink mechanism can also be used.

The term "halo" or "halo effect" refers to a white or grayish band that can appear at the interface of black and colored inks which occurs as a result of liquid or colorant migration.

"Wicking" refers to migration of ink from an image along paper fibers, thereby creating a ragged edge. A more ragged edge or interface between two printed inks is indicative of increased wicking.

As used herein, "carboxyl," "carboxyl group," "carboxylic acid," or the like refers to a carboxylic acid group (COOH) or a salt thereof (COOM). Appropriate counterions (M) for the salt can include alkali metals such as sodium, lithium, or potassium; positively charged amines such as $NH_4^+$, $(CH_3)_4N^+$, $(CH_3)_3NH_4^+$; or the like.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1% to about 20% should be interpreted to include not only the explicitly recited concentration limits of 1% to about 20%, but also to include individual concentrations such as 2%, 3%, 4%, and sub-ranges such as 5% to 15%, 10% to 20%, etc.

In accordance with this, it is generally known that pigment-based black inks can provide better optical density and text print quality compared to dye based black inks. However, traditional pigment-based inks utilize polymeric dispersants, which can cause issues related to pen health, e.g., due to high viscosity, decal, and kogation. Furthermore, the use of extra non-adsorbed or non-chemically attached dispersants due to the equilibrium nature of the dispersant process can limit a formulator from adding other performance enhancing additives into certain ink-jet inks. It has been discovered that certain self-dispersed pigments having chemical bonded functional groups, e.g., charge stabilization surface groups, etc., can be used in pigment-based ink-jet inks with or without free polymeric dispersant. If used without polymeric dispersant, an ink formulator gains freedom to introduce other additives without as great a concern about pen health problems resulting from high content of the polymeric materials. Furthermore, it has also been recognized that when formulating ink-jet inks, it is beneficial to select or prepare pigments having multiple reactive groups attached to an aromatic ring, e.g., at least three in one embodiment. Particularly, as an aromatic ring generally provides a planar structure, by including multiple reactive groups on adjacent carbons of the aromatic ring, without being bound by any particular theory, the adjacently positioned reactive groups can act as a chelating moiety, which is believed to provide benefits with respect to increased stability, as well as reduced bleed, halo, and/or wicking in certain applications.

Thus, in accordance with these recognitions, it would be advantageous to provide ink compositions and ink sets which have improved long term stability, improved bleed control, reduced halo effect, and reduced wicking. In accordance with the present invention, an ink-jet ink composition can comprise a functionalized carbon pigment dispersed in an ink vehicle. The carbon pigment can have a functional group chemically attached thereto which includes an aromatic ring structure and multiple carboxyl groups attached to the aromatic ring structure. In one embodiment, there are at least three carboxyl groups attached to the aromatic ring structure. In another embodiment, there are at least two carboxyl groups attached to the aromatic ring structure, and the ink vehicle includes 1% to 50% by weight cosolvent comprising 2-pyrrolidone. At least two of the multiple carboxyl groups (or salts thereof) are positioned on adjacent carbon atoms of the aromatic ring structure.

In another embodiment, an ink set for ink-jet printing can comprise a black ink-jet ink and at least one colored ink-jet ink. The black ink-jet ink can comprise a functionalized carbon pigment dispersed in an ink vehicle, wherein carbon pigment includes a functional group chemically attached thereto. The functional group can include an aromatic ring structure and multiple carboxyl groups attached to the aromatic ring structure. In one embodiment, there are at least three carboxyl groups attached to the aromatic ring structure. In another embodiment, there are at least two carboxyl groups attached to the aromatic ring structure, and the ink vehicle includes 1% to 50% by weight cosolvent comprising 2-pyrrolidone. At least two of the multiple carboxyl groups (or salts thereof) can be positioned on adjacent carbon atoms of the aromatic ring structure.

In another embodiment, a method of ink-jet printing can comprise printing a black ink-jet ink in contact with a colored ink-jet ink on a paper substrate with substantially no bleed between the black ink-jet ink and the colored ink-jet ink. The black ink-jet ink can be non-reactive with respect to the colored ink-jet ink, and can comprise a functionalized carbon pigment dispersed in an ink vehicle. The carbon pigment can include a functional group chemically attached thereto which has an aromatic ring structure and multiple carboxyl groups attached to the aromatic ring structure. In one embodiment, there are at least three carboxyl groups attached to the aromatic ring structure. In another embodiment, there are at least two carboxyl groups attached to the aromatic ring structure, and the ink vehicle includes 1% to 50% by weight cosolvent comprising 2-pyrrolidone. At least two of the multiple carboxyl groups (or salts thereof) can be positioned on adjacent carbon atoms of the aromatic ring structure.

In each of the above embodiments, the carbon pigment can be almost any commercially available carbon pigment that provides acceptable optical density and print characteristics. Carbon pigments suitable for use in the present invention include, without limitation, carbon black, graphite, vitreous carbon, charcoal, and combinations thereof. In one aspect of the present invention, the carbon pigment is a carbon black pigment. Such carbon black pigments can be manufactured by a variety of known method such as a channel method, a contact method, a furnace method, an acetylene method, or a thermal method, and are commercially available from such vendors as Cabot Corporation, Columbian Chemicals Company, Degussa AG, and E.I. DuPont de Nemours and Company. Suitable carbon black pigments include, without limitation, Cabot pigments such as MONARCH 1400, MONARCH 1300, MONARCH 1100, MONARCH 1000, MONARCH 900, MONARCH 880, MONARCH 800, MONARCH 700, BP-700, CAB-O-JET 200, and CAB-O-JET 300; Columbian pigments such as RAVEN 7000, RAVEN 5750, RAVEN 5250, RAVEN 5000, and RAVEN 3500; Degussa pigments such as Color Black FW 200, RAVEN FW 2, RAVEN FW 2V, RAVEN FW 1, RAVEN FW 18, RAVEN S160, RAVEN FW S170, Special Black 6, Special Black 5, Special Black 4A, Special Black 4, PRINTEX U, PRINTEX 140U, PRINTEX V, and PRINTEX 140V; and TIPURE R-101 available from Dupont. Typically the carbon pigments of the present invention can be from about 10 nm to about 10 micrometers and in one aspect can be from 10 nm to about 500 nm in diameter, although sizes outside this range can be used if the pigment can remain dispersed and provide adequate color properties.

In one aspect of the present invention, the chemically attached dispersants can be aryl multi-carboxyl groups, such as aryl dicarboxylic acids and aryl tricarboxylic acids (triacids), or salts thereof. In each embodiment, at least two carboxyl groups can be positioned adjacently on the aryl ring, i.e. attached to adjacent carbon atoms on the ring structure thereby forming adjacent carbonyl groups. These chemically attached dispersants not only impart improved dispersion properties to the ink composition, but also contribute to a high degree of black to color bleed control, even in the absence of a reactive bleed control mechanism in the ink set. Those skilled in the art will recognize that such carboxylic acids can also be present in their salt form with cations such as $Na^+$, $Li^+$, $K^+$, $NH_4^+$, $(CH_3)_4N^+$, $(CH_3)_3NH_4^+$, and the like, depending on the components in the ink-jet ink composition. In one detailed aspect of the present invention, the dispersant can have the following chemical structure (Formula I), where the "*" indicates a point of attachment to the carbon pigment, either directly or through a known spacer grouping, as follows:

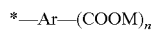

\*—Ar—(COOM)$_n$     Formula I where Ar is aryl, n is from 2-5, and M is H or a monovalent cation, e.g., Na, K, Li, or positive charge amine, with the proviso that at least two of the carboxyl groups (including carboxyl salts) are present at adjacent carbon atoms of the aryl ring, i.e., adjacent carbonyl groups. Exemplary structures that can be prepared and attached to a black pigment in accordance with Formula I are shown as follows:

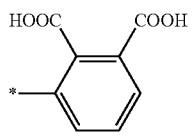
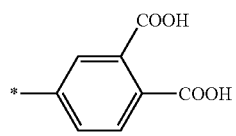
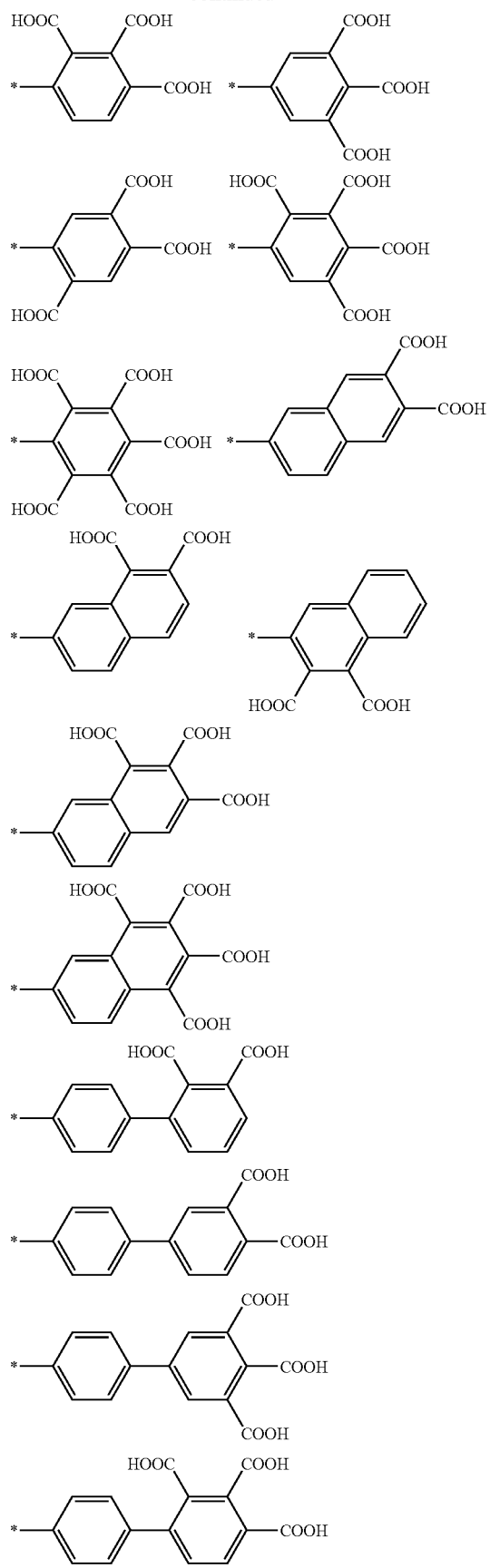

-continued

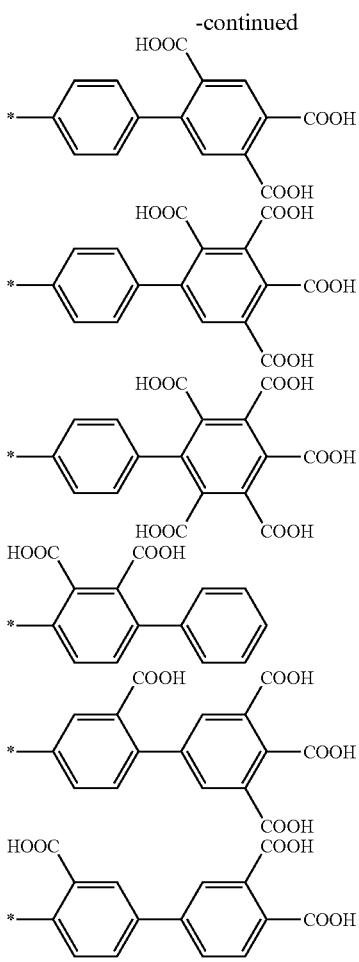

Though all of the example formulations shown above are in the carboxyl state, it is recognized that the hydrogen of each carboxylic acid can be replaced by a monovalent cation to form a salt thereof, as described in Formula I. Further, as can be seen above, though not all of the possible combinations are shown in accordance with Formula I, all functional groups include multiple carboxyl groups where at least two of the carboxyl groups are present on adjacent carbon atoms of the aryl ring(s) structure. As a further note, the functional groups defined in Formula I and by way of example above can be attached to carbon black pigment surfaces using amino or other mechanisms of reactive attachment. For example, 4-amino phthalic acid can be attached to a carbon black pigment to form a pigment functionalized with a 3,4-benzenedicarboxylic acid group where the carbon is defined at the 1-position (which was the 4-position amino group before attachment) As shorthand, the structure can be referred to as a 1-pigment-3,4-benzenedicarboxylic acid. Similarly, a 1-amino 3,4,5-benzenetricarboxylic acid can be used to attach a 3,4,5-benzenetricarboxylic acid to a pigment surface, resulting in a 1-pigment-3,4,5-benzenetricarboxylic acid. In each of these examples, the amino groups can act as leaving groups which facilitate attachment to the carbon black pigments. Referring to the structures such that the pigment is at the 1-position is done for convenience so that the nomenclature is internally consistent. This being stated, these dispersants can be functionalized onto the carbon pigment by any of a number known method. For example, U.S. Pat. Nos. 5,554,739 and 5,707,432, each of which is hereby incorporated by reference in their entirety to the extent consistent with the present disclosure, disclose methods of functionalizing carbon materials using diazonium salts.

In one detailed aspect of the present invention, the functionalized carbon pigment comprises from about 1% to about 20% by weight of the ink-jet ink composition, and often can comprise from about 2% to about 6% by weight of the ink-jet ink composition. When using colored pigments in the colored ink-jet ink to be printed in contact with the black ink-jet ink, the weight percentages of the pigment in the ink can be about the same as recited with respect to the functionalized carbon pigments described above. When using colored dyes in the colored ink-jet ink to be printed against the black ink-jet ink, the dye can typically be present in the ink-jet ink at from 1 wt % to about 10 wt %.

Regarding the liquid or ink vehicles described herein, the components discussed are generally relevant to both pigment-based ink-jet inks and dye-based ink-jet inks. Thus, to the extent that both types of inks are discussed herein, the discussion of such vehicles is applicable to both types of inks.

The ink-jet ink compositions of the present invention are typically prepared in an aqueous formulation or ink vehicle which can include water, cosolvents, surfactants, buffering agents, biocides, sequestering agents, viscosity modifiers, humectants, binders, and/or other known additives. In one aspect of the present invention, the ink vehicle can comprise from about 70% to about 98% by weight of the ink-jet ink composition. Further, other than the liquids of the vehicle, solids can also be dispersed it the liquid vehicle, such as polymers, photo curable materials, plasticizers, latex particulates, etc.

As described, cosolvents can be included in the ink-jet compositions of the present invention. Suitable cosolvents for use in the present invention include water soluble organic cosolvents, but are not limited to, aliphatic alcohols, aromatic alcohols, diols, glycol ethers, poly(glycol) ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones. For example, cosolvents can include primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, lactams, substituted formamides, unsubstituted formamides, substituted acetamides, and unsubstituted acetamides. Specific examples of cosolvents that are preferably employed in the practice of this invention include, but are not limited to, 1,5-pentanediol, 2-pyrrolidone, 2-ethyl-2-hydroxymethyl-1,3-propanediol, diethylene glycol, ethoxylated glycerol, 3-methoxybutanol, 1,3-dimethyl-2-imidazolidinone, or derivatives thereof. Cosolvents can be added to reduce the rate of evaporation of water in the ink to minimize clogging or other properties of the ink such as viscosity, pH, surface tension, optical density, and print quality. The cosolvent concentration can range from about 0 wt % to about 50 wt %, and in one embodiment is from about 15% to about 40% by weight. Multiple cosolvents can also be used, wherein each cosolvent is typically present at from about 2% to about 20% by weight of the ink-jet ink composition.

Various buffering agents can also be optionally used in the ink-jet ink compositions of the present invention. Typical buffering agents include such pH control solutions as hydroxides of alkali metals and amines, such as lithium hydroxide, sodium hydroxide, potassium hydroxide; citric acid; amines such as triethanolamine, diethanolamine, and dimethylethanolamine; and other basic or acidic components which do not interfere with the bleed control characteristics of the present invention. In some embodiments, no bleed control mechanisms are used within a given ink set. If used, buffering agents typically comprise less than about 10% by weight of the ink-jet ink composition.

In another aspect of the present invention, various biocides can be used to inhibit growth of undesirable microorganisms. Several non-limiting examples of suitable biocides include benzoate salts, sorbate salts, commercial products such as NUOSEPT (Nudex, Inc., a division of Huls America), UCARCIDE (Union Carbide), VANCIDE (RT Vanderbilt Co.), and PROXEL (ICI Americas) and other known biocides. Typically, such biocides comprise less than about 5% by weight of the ink-jet ink composition and often from about 0.1% to about 0.25% by weight.

In an additional aspect of the present invention, binders can be included which act to secure the colorants on the substrate. Binders suitable for use in the present invention typically have a molecular weight of from about 100 to about 50,000 g/mol. Non-limiting examples include polyester, polyester-melanine, styrene-acrylic acid copolymers, styrene-acrylic acid-alkyl acrylate copolymers, styrene-maleic acid copolymers, styrene-maleic acid-alkyl acrylate copolymers, styrene-methacrylic acid copolymers, styrene-methacrylic acid-alkyl acrylate copolymers, styrene-maleic half ester copolymers, vinyl naphthalene-acrylic acid copolymers, vinyl naphthalene-maleic acid copolymers, and salts thereof.

In one aspect of the present invention, the ink-jet ink compositions can include surfactants. Such surfactants can include standard water-soluble surfactants such as alkyl polyethylene oxides, alkyl phenyl polyethylene oxides, polyethylene oxide (PEO) block copolymers, acetylenic PEO, PEO esters, PEO amines, PEO amides, and dimethicone copolyols. If used, surfactants can be from 0.01% to about 10% by weight of the ink-jet ink composition. Various combinations of nonionic, anionic, and/or amphoteric surfactants can also be used.

In another aspect of the present invention, the black ink-jet ink described above can be included in an ink set for ink-jet printing. Such an ink set includes a black ink-jet ink having a functionalized carbon pigment dispersed in an ink vehicle, such as a functionalized carbon pigment described in accordance with Formula I. The black ink-jet ink can be formulated such that the ink is ink-jettable. At least one colored ink-jet ink is also prepared. Colored ink-jet ink(s) suitable for use in the present invention can be almost any ink-jettable ink formulation. Colored ink-jet ink(s) can be pigment based or dyes based inks. Further, the colored ink-jet ink(s) can be either reactive or non-reactive with a black ink-jet ink of the present invention, though in one embodiment, the colored ink is non-reactive with the black ink-jet ink. The colored pigments for use in the invention are not particularly limited, and inorganic pigments or organic pigments may be used. Suitable inorganic pigments include, for example, titanium oxide, cobalt blue ($CoO-Al_2O_3$), chrome yellow ($PbCrO_4$), and iron oxide. Suitable organic pigments includes, for example, azo pigments, polycyclic pigments (e.g., phthalocyanine pigments, perylene pigments, perynone pigments, anthraquinone pigments, quinacridone pigments, dioxazine pigments, thioindigo pigments, isoindolinone pigments and quinophthalone pigments), dye chelates (e.g., basic dye type chelates and acidic dye type chelate), nitropigments, nitroso pigments, and the like. The above-illustrated pigments can be used singly or in a combination of two or more. Colored dyes suitable for use in the present invention include, without limitation anionic water-soluble dyes and their ions, and any other known types of dyes that are functional in ink-jet architecture. Acid dyes, direct dyes, pacified reactive dyes, mordant dyes, dye lakes, etc., are exemplary of the types of dyes that can be used. More specific classes of dyes that can be used include azo dyes, phthalocyanine dyes, metalized dyes, non-metalized dyes, or the like. Although the above lists of colored pigments and dyes are provided, they are in no way intended to be limiting of the present invention and it will be understood that other known pigments and/or dyes can be used in conjunction with the black ink-jet inks of the present invention.

In one detailed aspect of the present invention, the ink set includes at least one colored inkjet ink which is non-reactive with the black ink-jet ink. As such, the colored and/or black ink-jet inks can be formulated to exclude salts, acids (or other pH modifiers), or polymers which are used in conjunction with known reactive ink sets. Alternatively, the colored ink-jet ink(s) of the present invention can be formulated to include salts, acids, and/or polymers which would act to form a reactive ink set in conjunction with the black ink-jet inks. Although inclusion of such components can be done, this will generally be done using separate orifice plates for the black and colored ink-jet ink compositions in order to reduce clogging of the orifice. However, generally the black ink-jet inks of the present invention exhibit good bleed control whether printed as part of non-reactive or reactive systems, and thus, a common orifice plate can be used if a non-reactive ink set is prepared.

Once the black and colored ink-jet inks are prepared, they can be placed into one or more ink-jet pens as is well known in the art. In one detailed aspect of the present invention, multiple colored ink-jet inks can be included in the ink set. Typically, in order to produce full color images, an ink set can include cyan, magenta, and yellow ink-jet ink compositions, or alternatively, cyan, pale cyan, magenta, pale magenta, and yellow ink-jet ink compositions. Other combinations are also possible. Black ink-jet inks can be present to provide a deeper black color to a printed image. Alternatively, various applications can use a single colored ink-jet ink with a black ink-jet ink.

EXAMPLES

The following examples illustrate the embodiments of the invention that are presently best known. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following Examples provide further detail in connection with what are presently deemed to be the most practical and preferred embodiments of the invention.

Example 1

Preparation of Black Ink-jet Inks Containing Functionalized Carbon Black Pigments Three carbon black pigments (BP700, Cabot) functionalized with a benzene dicarboxylic acid or a benzene tricarboxylic acid were provided for inclusion in various ink-jet inks. Specifically, a first pigment was functionalized with 5-amino isothalic acid (resulting in a 1-pigment-3,5-benzenedicarboxylic acid); a second pigment was functionalized with 4-amino phthalic acid (resulting in a 1-pigment-3,4-benzenedicarboxylic acid); and a third pigment was functionalized with a 1-amino 3,4,5-benzenetricarboxylic acid (resulting in a 1-pigment-3,4,5-benzenetricarboxylic acid). With respect to each of the above functionalized pigments, the 5-amino group, the 4-amino group, and the 1-amino group, respectively, are leaving groups which facilitate attachment to the carbon black pigments. Referring to the structures such that the pigment is at the 1-position is done for convenience so that the nomenclature is internally consistent. It is noted that the 1-pigment-3,5-benzenecarboxylic acid does not have adjacent carbonyl groups (carboxyl groups on adjacent carbon atoms of the benzene ring) in accordance with embodiments of the present invention, and thus, is used for comparison purposes.

Each of the three pigments was dispersed in an ink vehicle at 4 wt %. The three ink-jet inks prepared are set forth in Table 1, as follows:

TABLE 1

Black ink-jet ink with functionalized carbon black pigments

| Component | Wt % |
| --- | --- |
| 2-Pyrrolidone | 16 |
| Tetraethylene glycol | 2 |
| Ethoxylated glycerol | 1.5 |
| 2-Methyl-1,3-propanediol | 2 |
| Acetylenic dispersant | 0.15 |
| Fluorinated surfactant | 0.0075 |
| Styrenated polymeric dispersant | 1.4 |
| Tris(hydroxymethyl)aminomethane | 0.1 |
| Water | balance |

4 wt % pigment solids added to ink vehicle (3 inks prepared)
pH = 9.4
Surface Tension at 25° C. = 32.97 ± 0.64

Example 2

Preparation of Dye-Based Colored Ink-jet Inks

Four cyan-magenta-yellow (CMY) ink sets were prepared, two sets of which included bleed control agents (succinic acid) and two sets did not. The colored ink-jet ink set formulations are provided in Tables 2-5, as follows:

TABLE 2

Colored ink-jet ink set 1 (with succinic acid bleed control agent)

| Component | Cyan 1 (Wt %) | Magenta 1 (Wt %) | Yellow 1 (Wt %) |
| --- | --- | --- | --- |
| 2-pyrrolidone | 5.94 | 5.94 | 6.05 |
| 1,5-pentanediol | 11.78 | 11.78 | 12.20 |
| Tetraethylene glycol | 3.3 | 3.3 | 2.25 |
| Nonionic surfactant | 0.71 | 0.71 | 0.92 |
| Amphoteric surfactant | 1.66 | 1.66 | 1.31 |
| Anionic surfactant | 0.5 | 0.5 | 0.5 |
| Ethyloxylated fatty phosphate ester | 0.38 | 0.38 | 0.25 |
| EDTA-Na salt | 0.127 | 0.127 | 0.127 |
| Succinic acid | 5.15 | 5.15 | 4.50 |
| Sulfonated phthalocyanine dye | 0.0935 ($\frac{1}{10}$ k at 617 nm) | | |
| AB9-Na | 0.1 ($\frac{1}{10}$ k at 630 nm) | | |
| M377 | | 0.03 ($\frac{1}{10}$ k at 518 nm) | |
| AR52-Na | | 0.22 ($\frac{1}{10}$ k at 566 nm) | |
| DY132-Na | | | 0.152 ($\frac{1}{10}$ k at 402 nm) |
| AY23-Na | | | 0.038 ($\frac{1}{10}$ k at 429 nm) |
| Water | balance | balance | balance |

Adjust with NaOH or HNO$_3$ to achieve pH ~4
Surface Tension at 25° C. = Cyan 29.9; Magenta 30.1; and Yellow 30.2
Dye concentrations provided as target absorbance rather than weight percent

TABLE 3

Colored ink-jet ink set 2 (without succinic acid bleed control agent)

| Component | Cyan 2 (Wt %) | Magenta 2 (Wt %) | Yellow 2 (Wt %) |
| --- | --- | --- | --- |
| 2-pyrrolidone | 5.94 | 5.94 | 6.05 |
| 1,5-pentanediol | 11.78 | 11.78 | 12.20 |
| Tetraethylene glycol | 3.3 | 3.3 | 2.25 |
| Nonionic surfactant | 0.71 | 0.71 | 0.92 |
| Amphoteric surfactant | 1.66 | 1.66 | 1.31 |
| Anionic surfactant | 0.5 | 0.5 | 0.5 |
| Ethyloxylated fatty phosphate ester | 0.38 | 0.38 | 0.25 |
| EDTA-Na salt | 0.127 | 0.127 | 0.127 |
| Succinic Acid | — | — | — |
| Sulfonated phthalocyanine dye | 0.0935 ($\frac{1}{10}$ k at 617 nm) | | |
| AB9-Na | 0.1 ($\frac{1}{10}$ k at 630 nm) | | |
| M377 | | 0.03 ($\frac{1}{10}$ k at 518 nm) | |
| AR52-Na | | 0.22 ($\frac{1}{10}$ k at 566 nm) | |
| DY132-Na | | | 0.152 ($\frac{1}{10}$ k at 402 nm) |
| AY23-Na | | | 0.038 ($\frac{1}{10}$ k at 429 nm) |
| Water | balance | balance | balance |

Adjust with NaOH or HNO$_3$ to achieve pH 7-8.5
Surface Tension at 25° C. = Cyan 30.13; Magenta 30.35; and Yellow 30.47
Dye concentrations provided as target absorbance rather than weight percent

TABLE 4

Colored ink-jet ink set 3 (without succinic acid bleed control agent)

| Component | Cyan 3 (Wt %) | Magenta 3 (Wt %) | Yellow 3 (Wt %) |
|---|---|---|---|
| 2-pyrrolidone | 5 | 5 | 5 |
| 1,6-hexanediol | 9 | 9 | 9 |
| 1-(2-hydroxyethyl)-2-pyrrolidone | 9 | 9 | 9 |
| Acetylenic dispersant | 0.16 | 0.16 | 0.16 |
| Anionic surfactant | 0.32 | 0.32 | 0.32 |
| Florinated surfactant | 0.2 | 0.2 | 0.2 |
| Ethyloxylated fatty phosphate ester | 0.38 | — | 0.25 |
| MOPS buffer | 0.18 | 0.1 | 0.18 |
| EDTA Na salt | 0.1 | 0.0075 | 0.1 |
| Biocide | 0.1 | 0.1 | 0.1 |
| Sulfonated phthalocyanine dye | 0.134 (1/10 k at 611 nm) | | |
| M700 | | 0.091 (1/10 k at 532 nm) | |
| AR52 | | 0.091 (1/10 k at 566 nm) | |
| Y1189 | | | 0.149 (1/10 k at 393 nm) |
| AY17 | | | 0.021 (1/10 k at 402 nm) |
| Water | balance | balance | balance |

Adjust with NaOH or HNO$_3$ to achieve pH ~7.3-7.4
Surface Tension at 25° C. = Cyan 25; Magenta 24.4; and Yellow 24.0
Dye concentrations provided as target absorbance rather than weight percent

TABLE 5

Colored ink-jet ink set 4 (with succinic acid bleed control agent)

| Component | Cyan 4 (Wt %) | Magenta 4 (Wt %) | Yellow 4 (Wt %) |
|---|---|---|---|
| Cyan 3 | 94.85 | — | — |
| Magenta 3 | — | 94.85 | — |
| Yellow 3 | — | — | 95.5 |
| Succinic acid | 5.15 | 5.15 | 4.5 |

Adjust with NaOH or HNO$_3$ to achieve pH ~4
Surface Tension at 25° C. = Cyan 24.7; Magenta 24.9; and Yellow 24.4

Example 3

Bleed

Color to black bleed was evaluated using the three black ink-jet inks forth of Table 1 and the 12 color ink-jet inks (four CMY ink sets) of Tables 2-5. Printing was carried out on using an HP OfficeJet Pro K550 on three papers, namely HP Multipurpose paper, HP Bright White paper, and Neenah Classic Laid paper to evaluate printing performance. The values provided herein represent an average performance over the three papers.

Bleed in mils (1/1000 inch) was measured by printing a thin (1-2 mm) black line using each of the three inks of Table 1 on each paper sample. A first portion of each of the black lines is printed on each of the papers without contact with other inks to provide reference line thickness. A second portion of each of the black lines is printed in contact (on both sides of the line) with each of the various colored inks set forth in Tables 2-5 to evaluate bleed compared to the reference section of the various lines. An optical device is used to measure the thickness of the black line along the first portion (where there is no contact with the colored ink) compared to the thickness of the black line along the second portion (where there is contact with the colored ink on both sides of the line). A value of zero indicates no bleed, whereas positive or negative numbers indicate some bleed. The closer this measured difference is to zero, the better the bleed control. Tables 6-8 provide bleed values for each of the cyan, magenta, and yellow inks of Tables 2-5 compared to each of the three black ink-jet inks of Table 1. As indicated previously, the values provided are averages over three types of paper.

TABLE 6

Cyan/Black bleed

| Black Ink | Cyan 1 (acid) | Cyan 2 (no acid) | Cyan 3 (acid) | Cyan 4 (no acid) |
|---|---|---|---|---|
| Ink containing 1-pigment-3,5-benzenedicarboxylic acid | 4.128 mils | 4.727 mils | −0.510 mils | 2.459 mils |
| Ink containing 1-pigment-3,4-benzenedicarboxylic acid | 1.113 mils | 1.618 mils | 0.091 mils | 1.629 |
| Ink containing 1-pigment-3,4,5-benzenetricarboxylic acid | 0.085 mils | 0.059 mils | −0.602 mils | −0.041 |

TABLE 7

Magenta/Black bleed

| Black Ink | Magenta 1 (acid) | Magenta 2 (no acid) | Magenta 3 (acid) | Magenta 4 (no acid) |
|---|---|---|---|---|
| Ink containing 1-pigment-3,5-benzenedicarboxylic acid | 3.228 mils | 4.313 mils | −0.847 mils | 2.091 mils |
| Ink containing 1-pigment-3,4-benzenedicarboxylic acid | 0.749 mils | 1.513 mils | −0.49 mils | 0.318 mils |
| Ink containing 1-pigment-3,4,5-benzenetricarboxylic acid | −0.218 mils | −0.363 mils | −0.66 mils | −0.508 mils |

TABLE 8

Yellow/Black bleed

| Black Ink | Yellow 1 (acid) | Yellow 2 (no acid) | Yellow 3 (acid) | Yellow 4 (no acid) |
|---|---|---|---|---|
| Ink containing 1-pigment-3,5-benzenedicarboxylic acid | 4.073 mils | 3.165 mils | −0.251 mils | 1.321 mils |
| Ink containing 1-pigment-3,4-benzenedicarboxylic acid | 1.162 mils | 1.581 mils | −0.057 mils | 0.789 mils |
| Ink containing 1-pigment-3,4,5-benzenetricarboxylic acid | 0.494 mils | −0.115 mils | −0.486 mils | −0.38 mils |

As can be seen in Tables 6-8, the bleed between the various colored inks compared to the 1-pigment-3,4-benzenedicarboxylic acid-containing ink and 1-pigment-3,4,5-benzenetricarboxylic acid-containing ink is generally better than the colored inks compared to the 1-pigment-3,5-benzenedicarboxylic acid-containing inks, particularly in no acid systems. The poorest performance was observed with the use of the 1-pigment-3,5-benzenedicarboxylic acid pigment which does not have adjacent dicarboxylic acids in accordance with embodiments of the present invention.

Example 4

Wicking

Color to black wicking was evaluated using the three black ink-jet inks of Table 1 and the 12 color ink-jet inks (four CMY ink sets) of Tables 2-5. Printing was carried out on using an HP OfficeJet Pro K550 on three papers, namely HP Multipurpose paper, HP Bright White paper, and Neenah Classic Laid paper to evaluate printing performance. The values provided herein represent an average performance over the three papers.

Wicking scores are measured and calculated based on printed images as follows. As with the bleed testing, thin (1-2 mm) black lines using each of the three inks of Table 1 are printed on each paper sample. A first portion of each of the black lines is printed on each of the papers without contact with other inks to provide a reference to compare against potential wicking. A second portion of each of the black lines is printed in contact with various colored inks of Tables 2-5 (on both sides of the line) to determine how much wicking occurs between the two inks. An optical device is used to measure the length of the jagged interface between the black ink and the colored ink compared to the length of the reference portion of the black line that does not have color ink printed in contact therewith. Thus, a higher number represents more jaggedness at the interface (more wicking) because the jagged line at the interface is longer compared to a straight control line. A value of zero indicates no wicking, whereas positive or negative numbers indicate at least some wicking. Tables 9-11 provide wicking values for each of the cyan, magenta, and yellow inks of Tables 2-5 compared to each of the three black ink-jet inks of Table 1. As indicated previously, the values provided are averages over three types of paper.

TABLE 9

Cyan/Black wicking

| Black Ink | Cyan 1 (acid) | Cyan 2 (no acid) | Cyan 3 (acid) | Cyan 4 (no acid) |
|---|---|---|---|---|
| Ink containing 1-pigment-3,5-benzenedicarboxylic acid | 52.695 | 74.751 | −0.072 | 43.166 |
| Ink containing 1-pigment-3,4-benzenedicarboxylic acid | 37.414 | 29.676 | 18.61 | 35.033 |
| Ink containing 1-pigment-3,4,5-benzenetricarboxylic acid | 16.493 | 18.344 | −.516 | 8.447 |

TABLE 10

Magenta/Black wicking

| Black Ink | Magenta 1 (acid) | Magenta 2 (no acid) | Magenta 3 (acid) | Magenta 4 (no acid) |
|---|---|---|---|---|
| Ink containing 1-pigment-3,5-benzenedicarboxylic acid | 55.906 | 53.628 | −0.204 | 52.334 |
| Ink containing 1-pigment-3,4-benzenedicarboxylic acid | 35.314 | 34.434 | 10.537 | 19.553 |
| Ink containing 1-pigment-3,4,5-benzenetricarboxylic acid | 19.833 | 16.189 | −1.329 | 4.662 |

TABLE 11

Yellow/Black wicking

| Black Ink | Yellow 1 (acid) | Yellow 2 (no acid) | Yellow 3 (acid) | Yellow 4 (no acid) |
|---|---|---|---|---|
| Ink containing 1-pigment-3,5-benzenedicarboxylic acid | 47.905 | 53.768 | 4.663 | 36.256 |
| Ink containing 1-pigment-3,4-benzenedicarboxylic acid | 31.991 | 29.544 | 14.473 | 24.898 |
| Ink containing 1-pigment-3,4,5-benzenetricarboxylic acid | 23.656 | 17.963 | 0.927 | 5.437 |

As can be seen in Tables 9-11, the wicking between the various colored inks compared to the 1-pigment-3,4-benzenedicarboxylic acid-containing ink and 1-pigment-3,4,5-benzenetricarboxylic acid-containing ink is generally better than the colored inks compared to the 1-pigment-3,5-benzenedicarboxylic acid-containing inks, particularly in no acid systems. In other words, the poorest performance was observed with the use of the 1-pigment-3,5-benzenedicarboxylic acid pigment which does not have adjacent dicarboxylic acids in accordance with embodiments of the present invention.

Example 5

Halo

Color to black halo was evaluated using the three black ink-jet inks of Table 1 and the 12 color ink-jet inks (four CMY ink sets) of Tables 2-5. Printing was carried out on using an HP OfficeJet Pro K550 and three papers, namely HP Multipurpose paper, HP Bright White paper, and Neenah Classic Laid paper to evaluate printing performance. The values provided herein represent an average performance over the three papers.

Halo scores are observed based on printed images as follows. Blocks of black inks set forth in Table 1 were printed in contact with color inks set forth in Tables 2-5. A scale of 1 to 7 is observed where 1 represents no visable halo and 7 represents a white halo band between the printed blocks that is greater than $6/300$". Specifically, halo scores are as follows: 1 represents no visible halo; 2 represents slight graying in some areas; 3 represents light gray line ($>2/300$" to $<4/300$"); 4 represents white cusps (>3/300"); 5 represents white line (>4/300"); 6 represents light gray and black band (>5/300"); and 7 represents white band (>6/300). Thus, a higher number represents greater halo, which is undesirable. Table 12 provides observed halo values averaged over each of the cyan, magenta, and yellow inks of Tables 2-5 printed against each of the three black ink-jet inks of Table 1. The averages provided are also based on the use of three different papers set forth above.

TABLE 12

Average Color/Black halo

| Black Ink | Ink set 1 (acid) | Ink set 2 (no acid) | Ink set 3 (acid) | Ink set 4 (no acid) |
|---|---|---|---|---|
| Ink containing 1-pigment-3,5-benzenedicarboxylic acid | 6.33 | 7 | 5.33 | 6.33 |
| Ink containing 1-pigment-3,4-benzenedicarboxylic acid | 6.33 | 6.83 | 5 | 4.83 |
| Ink containing 1-pigment-3,4,5-benzenetricarboxylic acid | 4.83 | 4.83 | 2.5 | 2.5 |

As can be seen in Table 12, the halo between the various colored inks compared to the 1-pigment-3,4-benzenedicarboxylic acid-containing ink and 1-15 pigment-3,4,5-benzenetricarboxylic acid-containing ink is generally better than the colored inks compared to the 1-pigment-3,5-benzenedicarboxylic acid-containing inks, particularly in no acid systems. Again, the poorest performance was observed with the use of the 1-pigment-3,5-benzenedicarboxylic acid pigment which does not have adjacent dicarboxylic acids in accordance with embodiments of the present invention.

Example 6

Preparation of Pigment-based Colored Ink-jet Ink

A yellow ink-jet ink including yellow pigments is prepared in accordance with Table 13 below.

TABLE 13

Ink-jet ink with yellow pigment

| Component | Wt % |
|---|---|
| Yellow IJX800 (8.95% solids) | 4 |
| Binder | 1.5 |
| Biocide | 0.2 |
| Ethoxylated glycerol | 3 |
| 2-Pyrrolidone | 6 |
| Glycerol | 5 |
| 1,2-Hexanediol | 4 |
| Nonionic surfactant | 0.75 |
| Neopentyl alcohol | 0.75 |
| Fluorinated surfactant | 0.2 |
| Water | balance |

Example 7

Bleed

Color to black bleed between the pigment-based yellow ink-jet ink of Table 13 and a black ink-jet ink containing about 4 wt % of a 1-pigment-3,4,5-benzenetricarboxylic acid was evaluated. As a control, the yellow ink-jet ink of Table 13 was also tested against a similarly configured black ink-jet ink, with the exception that the black pigment was a carbon black pigment having a styrene-maleic anhydride (SMA) polymer attached thereto. The bleed was tested on Gilbert Bond paper, HP Bright White paper, HP Printing Paper, and HP Multi-Purpose Paper. Printing was carried out using a prototype printer. Using the general bleed control procedures set forth in Example 3 above, the bleed was significantly better using the 1-pigment-3,4,5-benzenetricarboxylic acid-containing ink-jet ink compared to the SMA functionalized pigment-containing ink-jet ink. For example, the bleed ranged from about 13 to about 20 mils when using the former pigment-based ink, and the bleed ranged from about 23 to about 43 for the latter pigment-based ink-jet ink.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the claims.

What is claimed is:

1. An ink set for ink-jet printing, comprising:
a) a black ink-jet ink including a functionalized carbon pigment dispersed in an ink vehicle, said carbon pigment including a functional group chemically attached thereto, wherein the functional group includes an aromatic ring structure and at least three carboxyl groups attached to the aromatic ring structure, and wherein at least two of the at least three carboxyl groups are positioned on adjacent carbon atoms of the aromatic ring structure; and
b) at least one colored ink-jet ink,
wherein the colored ink-jet ink is non-reactive with the black ink-jet ink, and wherein a precipitant is not formed upon contact between the colored ink-jet ink and the black ink-jet ink.

2. The ink set of claim 1, wherein the functional group is a benzenetricarboxylic acid.

3. The ink set of claim 1, wherein the aromatic ring is attached directly to the carbon pigment.

4. The ink set of claim 1, wherein the aromatic ring is benzene.

5. The ink set of claim 1, wherein the aromatic ring is naphthalene or biphenyl.

6. The ink set of claim 1, wherein the carboxyl groups are in a salt form.

7. The ink set of claim 1, wherein the carbon pigment comprises from about 2% to about 6% by weight of the ink-jet ink composition.

8. The ink set of claim 1, wherein the ink vehicle of the black ink-jet ink includes at least one organic cosolvent selected from the group consisting of 2-pyrrolidone, tetrahylene glycol, ethoxylated glycerol, 2-methyl-1,3-propanediol, and derivatives thereof.

9. The ink set of claim 1, wherein the black ink-jet ink further comprises a styrene-maleic anhydride copolymer.

10. The ink set of claim 1, wherein the colored ink-jet ink is a dye-containing ink-jet ink.

11. The ink set of claim 1, wherein the colored ink-jet ink is a pigment-containing ink-jet ink.

12. The ink set of claim 1, wherein the black ink-jet ink and the colored ink-jet ink have at least one organic cosolvent in common.

13. An ink set for ink-jet printing, comprising:
 a) a black ink-jet ink including a functionalized carbon pigment dispersed in an ink vehicle, said ink vehicle comprising 1% to 50% by weight of organic cosolvent comprising 2-pyrrolidone or derivative thereof, said carbon pigment including a functional group chemically attached thereto, wherein the functional group includes an aromatic ring structure and multiple carboxyl groups attached to the aromatic ring structure, and wherein at least two of the multiple carboxyl groups are positioned on adjacent carbon atoms of the aromatic ring structure; and
 b) at least one colored ink-jet ink,
 wherein the colored ink-jet ink is non-reactive with the black ink-jet ink, and wherein a precipitant is not formed upon contact between the colored ink-jet ink and the black ink-jet ink.

14. The ink set of claim 13, wherein the functional group is a benzenedicarboxylic acid.

15. The ink set of claim 13, wherein the functional group is selected from the group consisting of a 3,4,5-benzenetricarboxylic acid and a 3,4-benzenedicarboxylic acid, where the 1-position of each functional group corresponds to a site of attachment to the carbon pigment.

16. The ink set of claim 13, wherein the aromatic ring is attached directly to the carbon pigment.

17. The ink set of claim 13, wherein the aromatic ring is benzene.

18. The ink set of claim 13, wherein the aromatic ring is naphthalene or biphenyl.

19. The ink set of claim 13, wherein the carboxyl groups are in a salt form.

20. The ink set of claim 13, wherein the carbon pigment comprises from about 2% to about 6% by weight of the ink-jet ink composition.

21. The ink set of claim 13, wherein the cosolvent of the black ink-jet ink includes at least one member selected from the group consisting of tetraethylene glycol, ethoxylated glycerol, 2-methyl-1,3-propanediol, and derivatives thereof.

22. The ink set of claim 13, wherein the black ink-jet ink further comprises a styrene-maleic anhydride copolymer.

23. The ink set of claim 13, wherein the colored ink-jet ink is a dye-containing ink-jet ink.

24. The ink set of claim 13, wherein the colored ink-jet ink is a pigment-containing ink-jet ink.

25. The ink set of claim 13, wherein the black ink-jet ink and the colored ink-jet ink have at least one organic cosolvent in common.

26. A method of ink-jet printing, comprising printing a black ink-jet ink in contact with a colored ink-jet ink on a paper substrate with substantially no bleed between the black ink-jet ink and the colored ink-jet ink, wherein said black ink-jet ink is non-reactive with respect to the colored ink-jet ink, said black ink-jet ink comprising a functionalized carbon pigment dispersed in an ink vehicle, said carbon pigment including a functional group chemically attached thereto, wherein the functional group includes an aromatic ring structure having at least three carboxyl groups attached to the aromatic ring structure, and wherein at least two of the at least three carboxyl groups are positioned on adjacent carbon atoms of the aromatic ring structure.

27. The method of claim 26, wherein the functional group is a benzenetricarboxylic acid.

28. The method of claim 26, wherein the aromatic ring is attached to the carbon pigment by reaction through an azo group.

29. The method of claim 26, wherein the aromatic ring is benzene.

30. The method of claim 26, wherein the aromatic ring is naphthalene or biphenyl.

31. The method of claim 26, wherein the carboxyl groups are in a salt form.

32. The method of claim 26, wherein the carbon pigment comprises from about 2% to about 6% by weight of the ink-jet ink composition.

33. The method of claim 26, wherein the ink vehicle of the black ink-jet ink includes at least one cosolvent selected from the group consisting of 2-pyrrolidone, tetraethylene glycol, ethoxylated glycerol, 2-methyl-1,3-propanediol, and derivatives thereof.

34. The method of claim 26, wherein the black ink-jet ink further comprises a styrene-maleic anhydride copolymer.

35. The method of claim 26, wherein the colored ink-jet ink is a dye-containing ink-jet ink.

36. The method of claim 26, wherein the colored ink-jet ink is a pigment-containing ink-jet ink.

37. The method of claim 26, wherein the black ink-jet ink and the colored ink-jet ink have at least one organic cosolvent in common.

38. The method of claim 26, wherein the paper substrate is a plain paper substrate.

39. The method of claim 26, wherein the paper substrate is a coated paper substrate.

40. The method of claim 39, wherein the coated paper substrate includes a swellable polymer-based coating.

41. The method of claim 39, wherein the coated paper substrate includes an inorganic porous particulate-based coating.

42. The method of claim 26, wherein the paper substrate includes a divalent ion which can be chelated by at least two of the multiple carboxylic acid groups positioned on adjacent carbon atoms of the aromatic ring structure.

43. A method of ink-jet printing, comprising printing a black ink-jet ink in contact with a colored ink-jet ink on a paper substrate with substantially no bleed between the black ink-jet ink and the colored ink-jet ink, wherein said black ink-jet ink is non-reactive with respect to the colored ink-jet ink, said black ink-jet ink comprising a functionalized carbon pigment dispersed in an ink vehicle, said ink vehicle comprising 1% to 50% by weight of organic cosolvent comprising 2-pyrrolidone or derivative thereof, said carbon pigment including a functional group chemically attached thereto, wherein the functional group includes an aromatic ring structure having multiple carboxyl groups attached to the aromatic ring structure, and wherein at least two of the multiple carboxyl groups are positioned on adjacent carbon atoms of the aromatic ring structure.

44. The method of claim 43, wherein the functional group is a benzenedicarboxylic acid.

45. The method of claim 43, wherein the functional group is selected from the group consisting of a 3,4,5-benzenetricarboxylic acid and a 3,4-benzenedicarboxylic acid, where the 1-position of each functional group corresponds to a site of attachment to the carbon pigment.

46. The method of claim 45, wherein the aromatic ring is attached to the carbon pigment by reaction through an azo group.

47. The method of claim 45, wherein the aromatic ring is benzene.

48. The method of claim 45, wherein the aromatic ring is naphthalene or biphenyl.

49. The method of claim 45, wherein the carboxyl groups are in a salt form.

50. The method of claim 45, wherein the carbon pigment comprises from about 2% to about 6% by weight of the ink-jet ink composition.

51. The method of claim 45, wherein the ink vehicle of the black ink-jet ink includes at least one cosolvent selected from the group consisting of 2-pyrrolidone, tetrathylene glycol, ethoxylated glycerol, 2-methyl-1,3-propanediol, and derivatives thereof.

52. The method of claim 45, wherein the black ink-jet ink further comprises a styrene-maleic anhydride copolymer.

53. The method of claim 45, wherein the colored ink-jet ink is a dye-containing ink-jet ink.

54. The method of claim 45, wherein the colored ink-jet ink is a pigment-containing ink-jet ink.

55. The method of claim 45, wherein the black ink-jet ink and the colored ink-jet ink have at least one organic cosolvent in common.

56. The method of claim 45, wherein the paper substrate is a plain paper substrate.

57. The method of claim 45, wherein the paper substrate is a coated paper substrate.

58. The method of claim 57, wherein the coated paper substrate includes a swellable polymer-based coating.

59. The method of claim 57, wherein the coated paper substrate includes an inorganic porous particulate-based coating.

60. The method of claim 45, wherein the paper substrate includes a divalent ion which can be chelated by at least two of the multiple carboxylic acid groups positioned on adjacent carbon atoms of the aromatic ring structure.

* * * * *

UNITED STATES PATENT AND TRADEMARK OFFICE
CERTIFICATE OF CORRECTION

PATENT NO. : 8,268,064 B2
APPLICATION NO. : 11/540140
DATED : September 18, 2012
INVENTOR(S) : Kai-Kong Iu et al.

It is certified that error appears in the above-identified patent and that said Letters Patent is hereby corrected as shown below:

In column 18, lines 59-60, in Claim 8, delete "tetrathylene" and insert -- tetraethylene --, therefor.

In column 19, line 42, in Claim 21, delete "tetrathylene" and insert -- tetraethylene --, therefor.

In column 20, line 16, in Claim 33, delete "tetrathylene" and insert -- tetraethylene --, therefor.

In column 21, line 10, in Claim 51, delete "tetrathylene" and insert -- tetraethylene --, therefor.

Signed and Sealed this
Nineteenth Day of March, 2013

Teresa Stanek Rea
*Acting Director of the United States Patent and Trademark Office*